(12) United States Patent
Matsuyama et al.

(10) Patent No.: US 6,689,961 B2
(45) Date of Patent: Feb. 10, 2004

(54) COMBINATIONAL WEIGHING APPARATUS WITH A STIRRING MEMBER THAT SLOPES DOWNWARD AT A DIFFERENT ANGLE THAN THE DISTRIBUTION TABLE

(75) Inventors: Isao Matsuyama, Shiga (JP); Shinji Shimokawa, Shiga (JP); Masahiko Tatsuoka, Shiga (JP); Takashi Kondo, Kyoto (JP)

(73) Assignee: Ishida Co., Ltd., Kyoto (JP)

( * ) Notice: Subject to any disclaimer, the term of this patent is extended or adjusted under 35 U.S.C. 154(b) by 158 days.

(21) Appl. No.: 10/083,506

(22) Filed: Feb. 27, 2002

(65) Prior Publication Data

US 2002/0139589 A1 Oct. 3, 2002

(30) Foreign Application Priority Data

Mar. 30, 2001 (JP) ........................................ 2001-101822

(51) Int. Cl.[7] ...................... G01G 19/387; B65G 37/00; B65G 47/72

(52) U.S. Cl. ...................... 177/25.18; 414/301; 198/533; 198/601; 198/598; 141/34; 141/286; 239/681; 239/687

(58) Field of Search ...................... 177/25.18; 414/301; 198/601, 532, 533, 598, 609, 614; 239/679, 681, 683, 687, 689; 141/285, 286, 34, 100, 131, 302

(56) References Cited

U.S. PATENT DOCUMENTS

| 3,543,954 A | * | 12/1970 | Marshall ...................... 414/301 |
| 4,167,248 A | * | 9/1979 | Akazawa et al. ........... 239/683 |
| 4,272,028 A | * | 6/1981 | Cobb .......................... 239/687 |
| 4,555,210 A | * | 11/1985 | Wigram ...................... 414/301 |
| 4,607,713 A | * | 8/1986 | Nishi et al. ............... 177/25.18 |
| 4,662,508 A | * | 5/1987 | Inoue et al. ................. 198/601 |
| 4,941,565 A | * | 7/1990 | Hirota et al. ............... 198/601 |

FOREIGN PATENT DOCUMENTS

| JP | 648638 | 1/1989 |
| JP | 2538633 | 4/1997 |
| JP | 2577716 | 5/1998 |

* cited by examiner

Primary Examiner—Randy Gibson
(74) Attorney, Agent, or Firm—Staas & Halsey LLP (57) ABSTRACT

A combinational weighing apparatus includes a distributing apparatus for distributing articles fed from above, a plurality of conveyance apparatuses disposed radially below and around the distributing apparatus and a plurality of weighing apparatuses disposed below the respective plurality of conveyance apparatuses, the distributing apparatus including a conical distributing table, a stirring member having one end attached to a rotation shaft arranged at an apex portion of the distributing table and the other end extending slantwise downward to the vicinity of a peripheral edge of the distributing table, and a drive unit for rotating the rotation shaft, in which a gap is provided between a lower side of the stirring member and an upper surface of the distributing table so as to be increased downwards.

3 Claims, 9 Drawing Sheets

COMBINATIONAL WEIGHING APPARATUS WITH A STIRRING MEMBER THAT SLOPES DOWNWARD AT A DIFFERENT ANGLE THAN THE DISTRIBUTION TABLE

BACKGROUND OF THE INVENTION

1. Field of the Invention

The present invention relates to a combinational weighing apparatus for articles and, more particularly, to the improvement in a distributing apparatus provided in the weighing apparatus and belongs to the technical field of combinational weighing apparatuses.

2. Description of the Related Art

A combinational weighing apparatus for use in weighing articles executes combinational operation based on weights of articles measured by a plurality of weighing apparatuses to select an optimum combination whose combinational weight is most approximate to a target weight within a range of a predetermined allowable error, as well as discharging and collecting articles from the weighing apparatuses selected as the optimum combination, thereby obtaining an article whose weight is most approximate to the above-described target weight. In this case, the combinational weighing apparatus is provided with an article distributing apparatus in order to distribute and supply articles fed from a supply unit to the respective weighing apparatuses.

A distributing apparatus of this kind is disclosed, for example, in Japanese Utility Model Patent Laying-Open No. 64-8638, in which a conical distributing table is provided below an article supply unit, conveyance troughs are provided below the distributing table to surround the same, and a stirring blade extending toward a peripheral edge portion of the distributing table is attached in the vicinity of an upper end of a rotation shaft extending upwardly through an apex of the distributing table so as to have a small gap between the blade and an upper surface of the distributing table, so that the rotation shaft is rotated by a drive unit disposed below the distributing table.

According to the disclosed apparatus, articles fed from the article supply unit will fall down onto the distributing table disposed below and while falling further down along the distributing table, they will be distributed by the rotation of the stirring blade and transported to the conveyance troughs.

Another apparatus of this kind is disclosed in Japanese Utility Model Patent Registration No. 2577716, which includes rotary stirring blades disposed along a slanting surface of an upper portion of a distributing table at adjustable intervals, a conical distributing element disposed above the stirring blades so as to have an adjustable gap from the stirring blades, and a drive unit rotatable integrally with the stirring blades, whereby an article supplied from above falls on the slanting surface of the conical distributing element, and includes level sensors one each at the right and left side in the vicinity of a peripheral edge of the distributing table in order to constantly monitor the volume of articles supply to the distributing table to send a signal to the drive unit, thereby rotating the conical distributing element and the stirring blades toward accumulated articles whose thickness is small.

According to the apparatus, while being distributed on the slanting surface of the conical distributing element, articles fed from above will be supplied to the distributing table by the stirring blades and a thickness of articles accumulated on the distributing table is detected by the right and left level sensors to send a signal to the conical distributing element and the drive unit of the stirring blade for rotating the same toward accumulated articles whose thickness is small, thereby supplying articles so as to have approximately even thickness.

Disclosed in Japanese Utility Model Patent Registration No. 2538633 is an article distributing apparatus including a cylindrical container whose bottom surface slants downward from the central portion to a peripheral edge portion and which is disposed below an article supply port, a conical distributing member disposed above the central portion of the container so as to be reciprocally rotatable centered around a shaft center provided vertically, and a plurality of disentangling rods extending along the bottom surface of the container with their ones of opposite ends fixed to an inner circumference of the lower end of the distributing member. In this case, the circumference of the lower end of the distributing member at the bottom surface of the cylindrical container is regarded as a reception unit for receiving articles distributed by the distributing member, and at an outer circumference of the reception unit, a plurality of article discharge ports are disposed at equal intervals on the circumference.

According to the apparatus, articles supplied from the article supply port will be distributed by the distributing member and received by the reception unit of the cylindrical container and temporarily stored. Then, the articles will be disentangled by the reciprocal rotation of the disentangling rods attached to the distributing member and then discharged to the article discharge port.

With the distributing apparatus disclosed in Japanese Utility Model Patent Laying-Open No. 64-8638, however, because of a small gap between the upper surface of the distributing table and the lower side of the stirring blades, articles are liable to be caught between the distributing table and the blades while the stirring blades rotate. Once the caught of an article occurs, further articles will be entangled in the caught article to make a mass, resulting in gradually increasing the volume of articles caught and entangled. As a result, once such entanglement as this occurs, it is impossible to distribute the articles satisfactorily.

Figure 9:
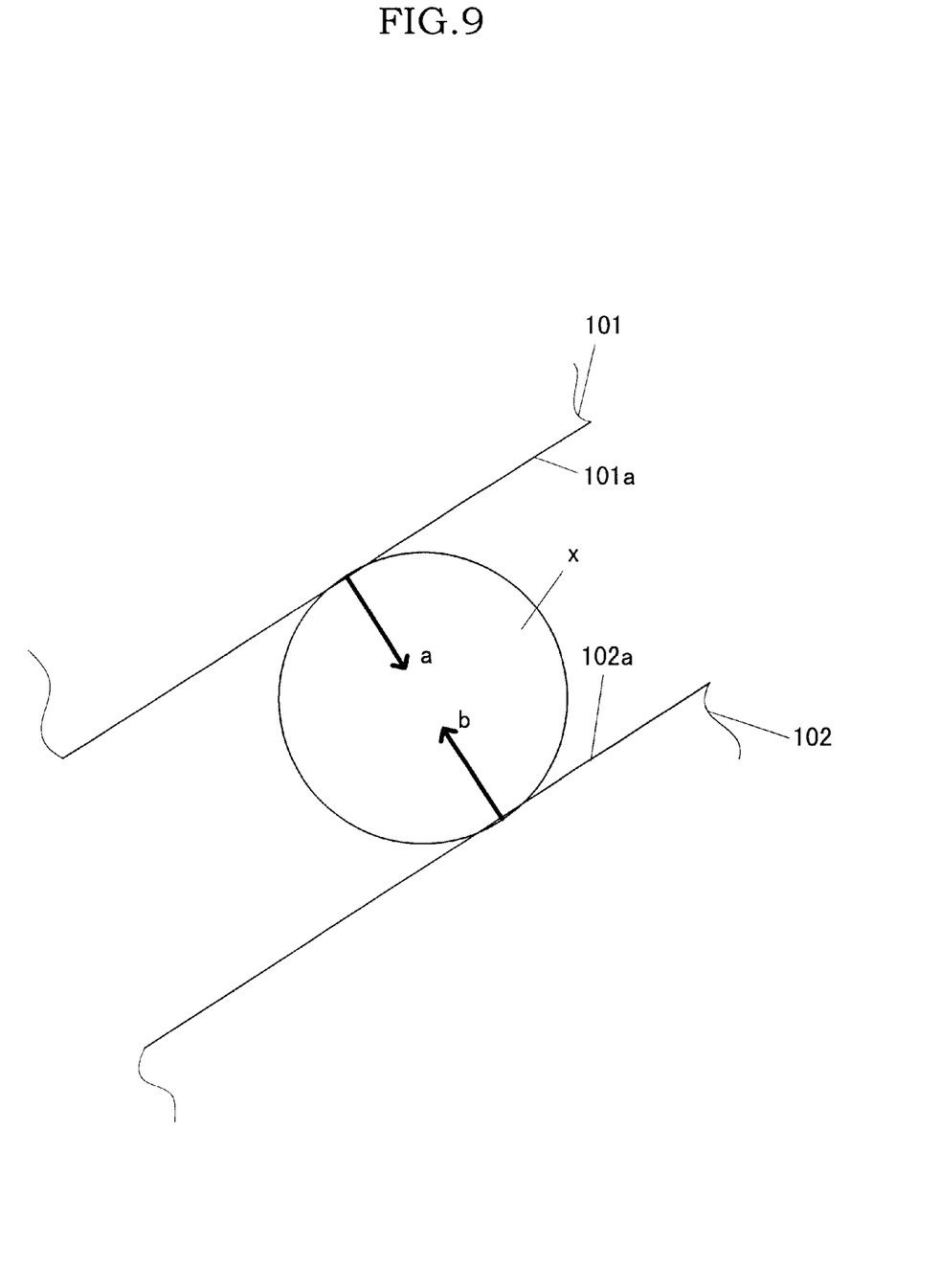
FIG. 9 is an expanded side view of a conventional distributing apparatus illustrating a force exerted from the apparatus onto an article X.

On the other hand, in the distributing apparatus disclosed in Japanese Utility Model Patent Registration No. 2577716, as shown in FIG. 9, while there is a large gap adjustable between a lower side 101a of a stirring blade 101 and an upper surface 102a of a distributing table 102, the gap is designed to be approximately parallel. Therefore, when an article x is caught between the lower side 101a of the stirring blade 101 and the upper surface 102a of the distributing table 102, there are generated opposing forces exerted on the article x, a force "a" directed from the lower side 101a of the stirring blade 101 toward the distributing table 102 and a force "b" directed from the upper surface 102a of the distributing table 102 toward the stirring blade 101, which will function as a force of catching the article x. As a result, once an article is caught, it will be hardly released, and similarly to the apparatus disclosed in Japanese Utility Model Patent Laying-Open No. 64-8638, a further article will be entangled in the caught article to result in insufficient distribution of articles.

Similarly to the distributing apparatus disclosed in Japanese Utility Model Patent Registration No. 2577716, the distributing apparatus disclosed in Japanese Utility Model Patent Registration No. 2538633 also has the problem that articles can not be satisfactorily distributed because a gap between an upper surface of the distributing table and a lower side of the disentangling rod is approximately parallel to each other.

SUMMARY OF THE INVENTION

Accordingly, it is an object of the present invention to provide a combinational weighing apparatus having a distributing apparatus capable of preventing articles from being caught in a gap between a distributing table and a stirring member to distribute articles as uniformly as possible.

According to one aspect of the present invention, the combinational weighing apparatus includes a distributing apparatus for distributing articles supplied from above, a plurality of conveyance apparatuses radially disposed below and around the distributing apparatus and a plurality of weighing apparatuses disposed below the respective conveyance apparatuses, the distributing apparatus including a conical distributing table, a stirring member having one end attached to a rotation shaft arranged at an apex portion of the distributing table and the other end extending slantwise downward to the vicinity of a peripheral edge of the distributing table, and a drive unit for rotating the rotation shaft, with a gap between a lower side of the stirring member and an upper surface of the distributing table being increased as it goes downward.

According to the present invention, the articles supplied from above fall onto the conical distributing table. At this time, rotation of the stirring member having one end attached to the rotation shaft arranged at the apex portion of the distributing table and the other end extending slantwise downward to the vicinity of the peripheral edge portion of the distributing table around the rotation shaft caused by the drive unit for rotating the rotation shaft to a predetermined direction results in distributing the articles. In this case, since the lower side of the stirring member is disposed to have a gap from the upper surface of the distributing table which is designed to become larger downwardly, when an article is caught between the lower side of the stirring member and the upper surface of the distributing table, a composite force of a force exerted from the stirring member onto the article and a force exerted from the distributing table onto the article will be a force directed slantwise downward. In other words, because a composite force works on the article which will bring the article from a place where the gap is small to a place where the same is large, even when the article is caught, it will be pushed downward, resulting in making the articles less liable to be continuously caught between the stirring member and the distributing table. Moreover, because the above-described composite force will work on an article at a time when the article comes into contact with the stirring blade rotating on the distributing table, it is less liable to be caught, which leads to reduction in the occurrence of a state where an article is caught. As a result, it is possible to minimize the occurrence of the state where articles are caught between the stirring member and the distributing table and even when it is caught, possible to release it in a short time period to enable articles to be distributed to the conveyance apparatuses as uniformly as possible.

According to another aspect of the present invention, the stirring member of the above-described invention is configured to exert a force on an article on the distributing table which makes the article directed toward a peripheral edge when rotating to come into contact with the article.

According to the present invention, when rotating to come into contact with an article on the distributing table, the stirring blade will exert a force onto the article so as to be directed toward the peripheral edge. As a result, the article will be pushed forward directly by the stirring member toward the direction in which the gap between the stirring member and the distributing table is increased, whereby the above-described functions and effects of the present invention are enhanced to further reduce the occurrence of the state where the articles are caught to enable as uniform distribution of articles to the conveyance apparatus as possible.

According to a further aspect, the distributing table of the above-described invention is characterized in being fixed to the main body of the weighing apparatus.

According to the present invention, being fixed to the main body of the weight apparatus, the distributing table will generate none of such oscillation as causing a measurement error. As a result, precision in measurement can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, description will be made of a combinational weighing apparatus according to embodiments of the present invention.

Figure 1:
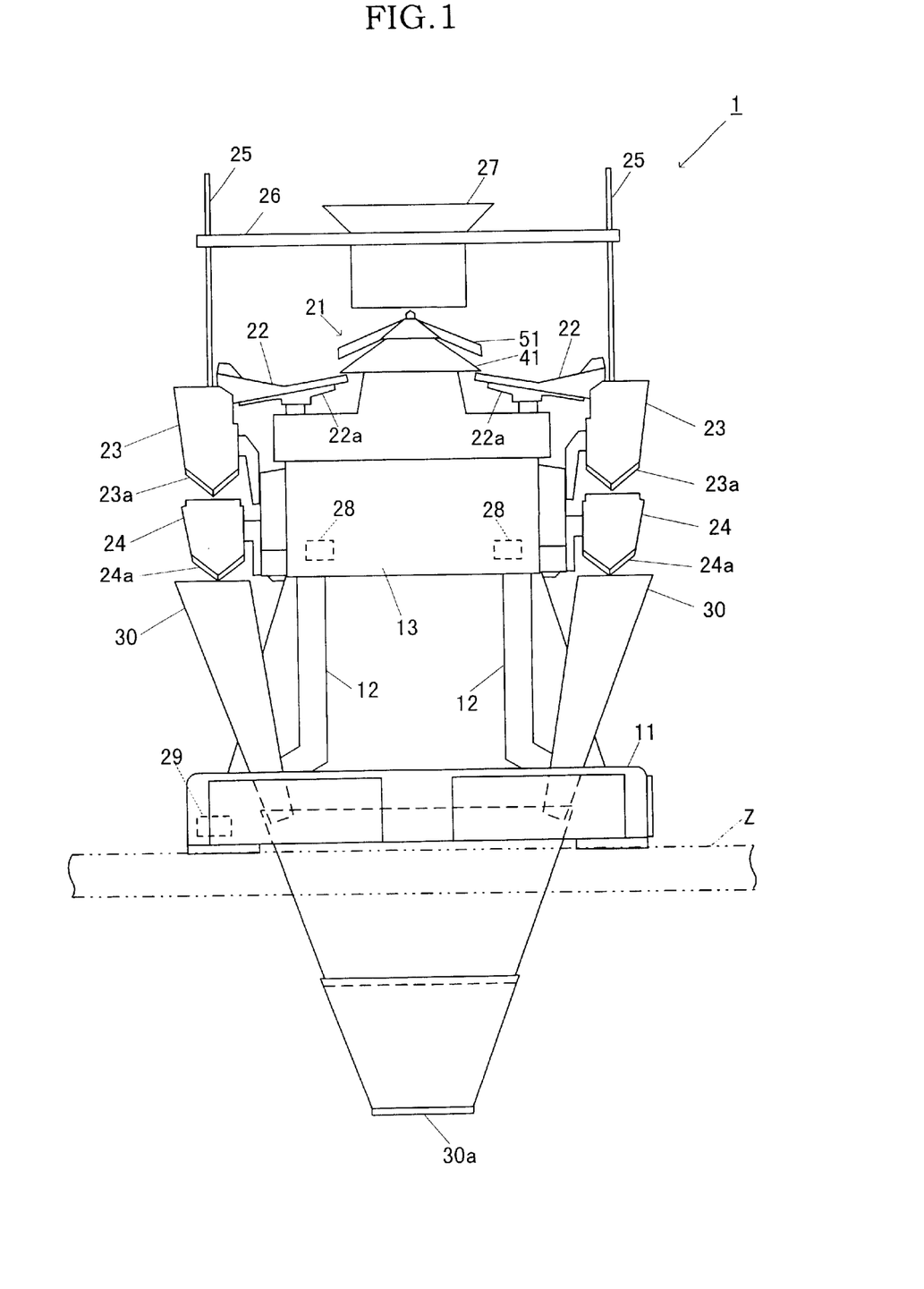
FIG. 1 is a side view of a main part of a combinational weighing apparatus according to the present invention.

As shown in FIG. 1, a combinational weighing apparatus 1 includes a main frame 11 disposed at a stage Z such as a frame and a pillar-shaped main case 13 supported on the main frame 11 by a plurality of support saddles 12 . . . 12, to which main case 13 fixed are a distributing apparatus 21 for distributing articles X, a plurality of conveyance feeders (conveyance apparatuses) 22 . . . 22 radially arranged around the distributing apparatus 21 and upper and lower pairs of pool hoppers 23 . . . 23 and weighing hoppers (weighing apparatuses) 24 . . . 24 each of which pair is provided for each of the feeders 22 . . . 22.

Provided above the distributing apparatus 21 is a hopper 27 supported by supporting members 25 . . . 25 and 26 to form an article supply unit. The articles X fed into the hopper 27 are supplied to the distributing apparatus 21, uniformly distributed to the conveyance feeders 22 . . . 22 and then supplied from the conveyance feeders 22 . . . 22 to the pool hoppers 23 . . . 23 due to vibration caused by excitation units 22a . . . 22a. Then, gates 23a . . . 23a are opened by an opening and closing mechanism not shown, so that the articles X are fed from the pool hoppers 23 . . . 23 into the weighing hoppers 24 . . . 24 where weights of the articles will be individually measured by weighing means 28 . . . 28 such as a load cell.

Here, a control unit 29 built in the main frame 11 executes combinational operation of the respective weight values to select a combination producing a weight or the number within an allowable rage of a target value and open gates 24a of the weighing hoppers 24 . . . 24 accommodating the articles X relevant to the combination by the opening and closing mechanism not shown, thereby discharging the articles X from the weighing hoppers 24 . . . 24 to a collection chute 30. The discharged articles X slide on the collection chute 30 to reach a discharge port 30a at the bottom from which the articles are discharged to, for example, a timing hopper or a packaging apparatus not shown.

Figure 2:
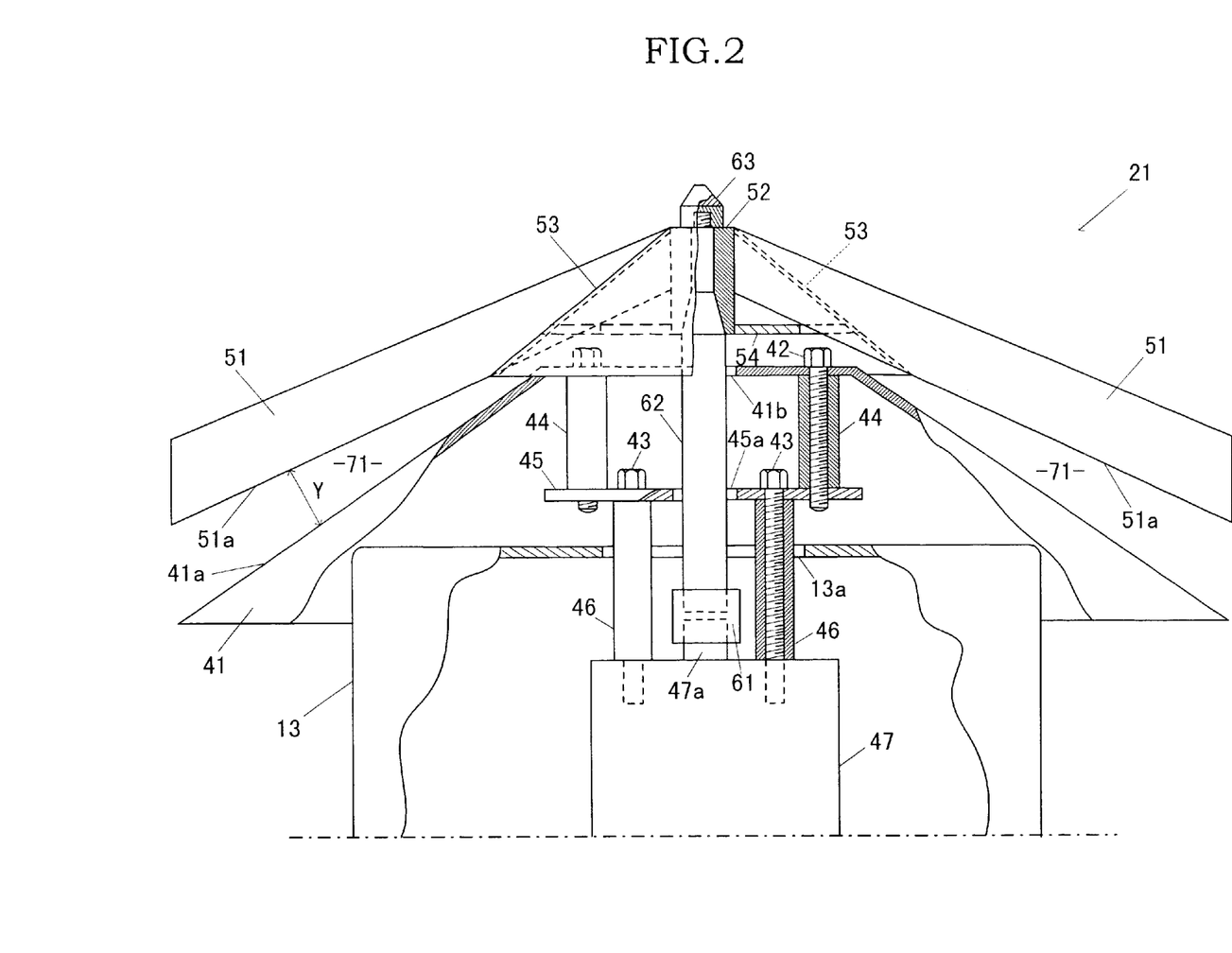
FIG. 2 is a partially cutaway side view of a distributing apparatus.
Figure 3:
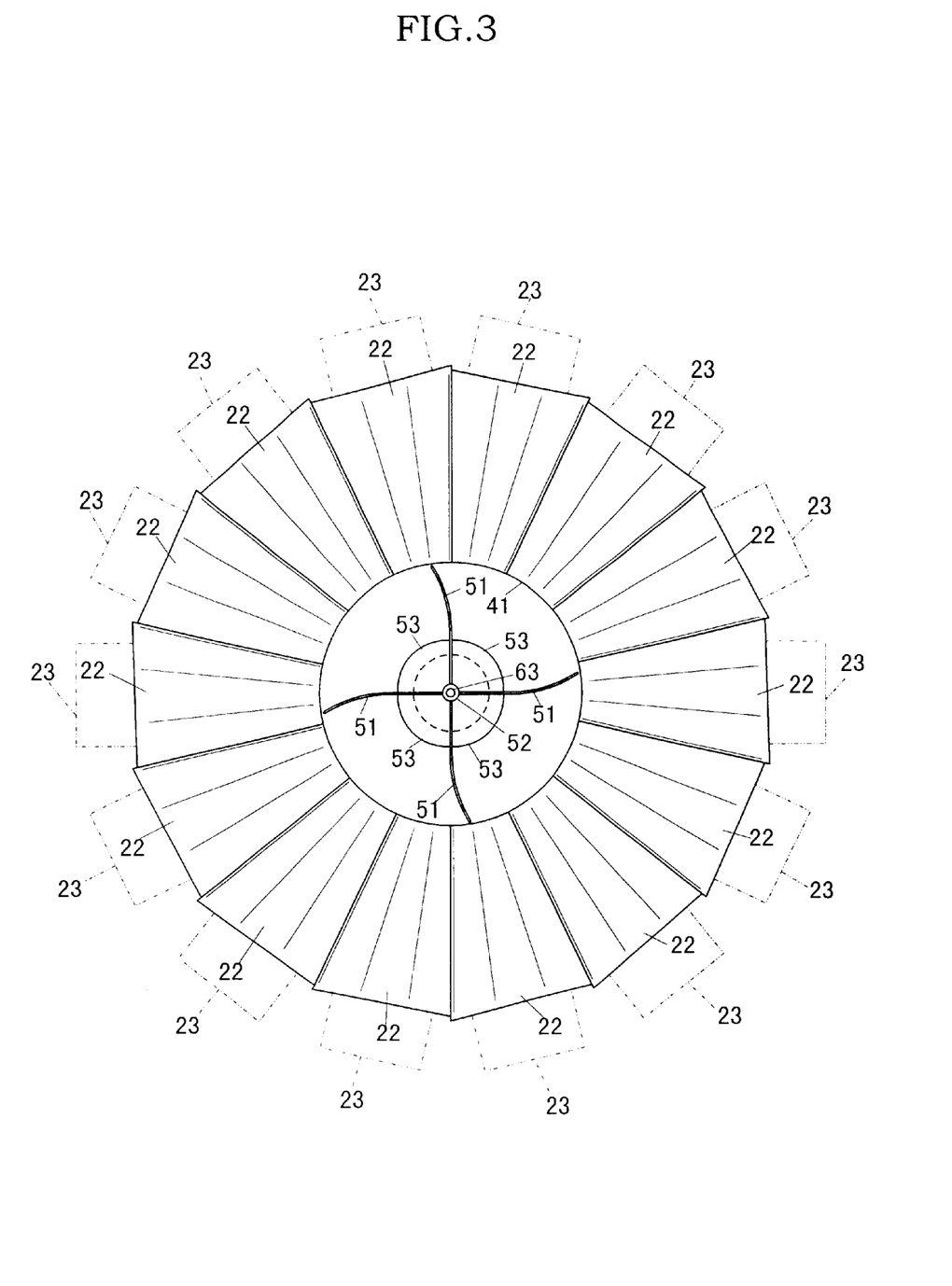
FIG. 3 is a plan view of a main peripheral part of the distributing apparatus.

On the other hand, as shown in FIGS. 2 and 3, the distributing apparatus 21 includes a distributing table 41 whose cone has its upper end portion cut. The distributing table 41 is fixed above a motor 47 with a speed reducer which is accommodated in the main case 13 by means of supporting members 44 . . . 44, 45, 46 . . . 46 set up by a plurality of bolt members 42 . . . 42 and 43 . . . 43.

The distributing apparatus 21 also includes a plurality (four in the illustrated example) of longitudinal plate-shaped stirring blades 51 . . . 51 radially extending above the distributing table 41, whose upper end portions are fixed to a cylindrical member 52. Attached between the upper end portions of the stirring blades 51 . . . 51 are cover members 53 . . . 53 shaped to be one-fourth of the cone to cover the upper portion of the distributing table 41, inside which members, a reinforcing member 54 is attached which reinforces a unit structure composed of the stirring blades 51 . . . 51, the cover members 53 . . . 53 and the cylindrical member 52.

A drive shaft 47a of the motor 47 with a speed reducer is connected to a rotation shaft 62 through a connection member 61. The rotation shaft 62 is inserted into and fixed to the cylindrical member 52 through an opening 13a of the main case 13, an opening 45a of the supporting member 45 and an opening 41b of the distributing table 41 to have its upper end portion fixed by a cap 63. Therefore, operating the motor 47 with a speed reducer will rotate the stirring blades 51 . . . 51 to a predetermined direction. Rotation speed is adjustable by a speed regulator not shown and is assumed to be, for example, approximately 30 to 60 rpm in order to prevent excessive scattering of the articles X.

On the other hand, provided between lower sides 51a . . . 51a of the stirring blades 51 . . . 51 and an upper surface 41a of the distributing table 41 is a gap 71 whose interval Y is designed to be increased downwards.

Figure 4:
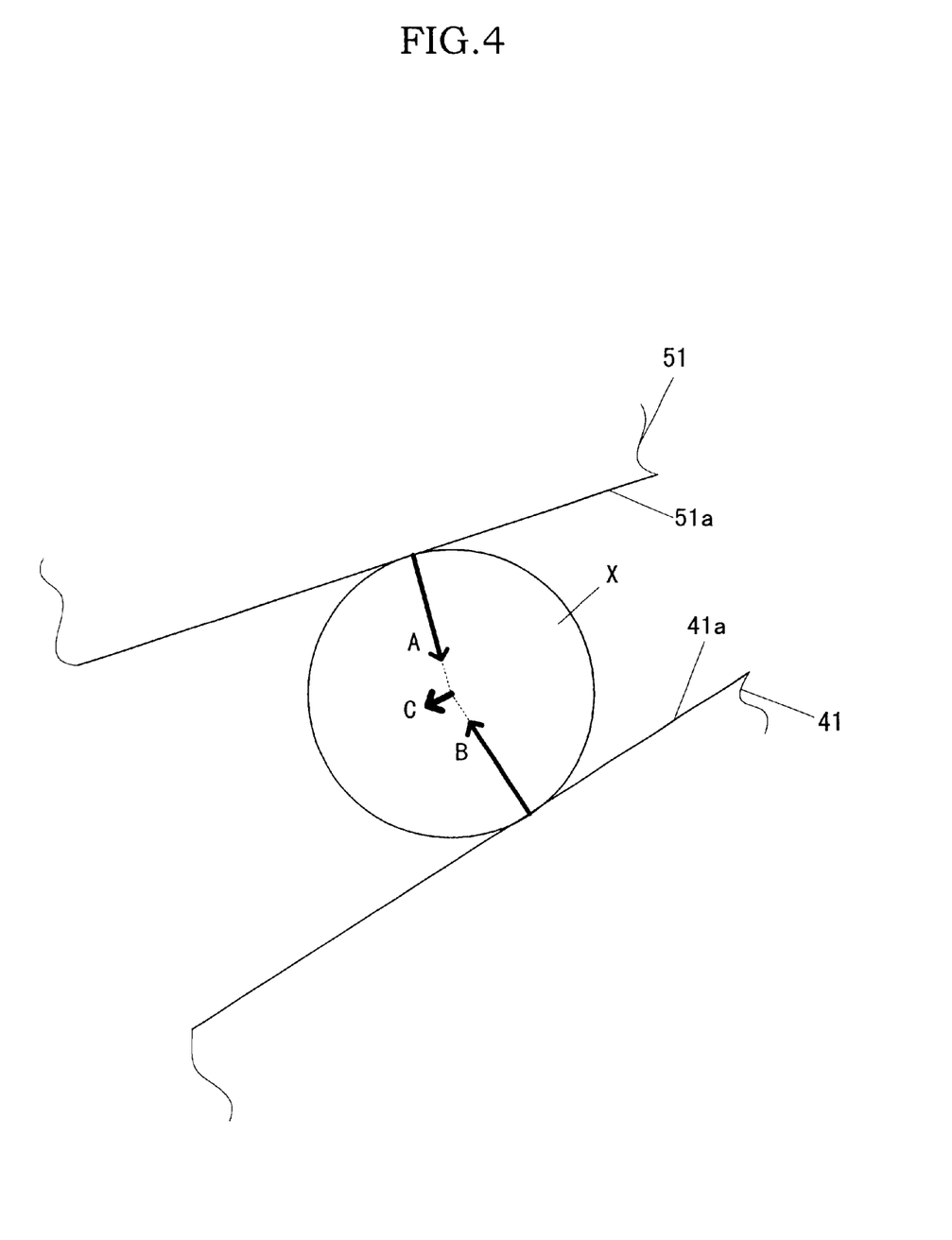
FIG. 4 is an expanded side view of a main part of the distributing apparatus illustrating a force exerted onto an article caught between a stirring blade and a distributing table.

With this arrangement, as shown in FIG. 4, when the stirring blades 51 . . . 51 come into contact with the article X on the distributing table 41, there will work a composite force C of a reaction force A exerted on the article X by the stirring blade 51 (reaction force A against a force exerted on the rotating stirring blade 51 by the stationary article X) and a reaction force B exerted on the article X by the distributing table 41 (reaction force B against a force of the article X pushing the distributing table 41 due to the reaction force A). In other words, in the same manner as the upper surface 41a of the distributing table 41 slants downward and the stirring blade 51 slants downward, the composite force C slants downward to cause the article X to have a force directed slantwise downward.

Figure 5:
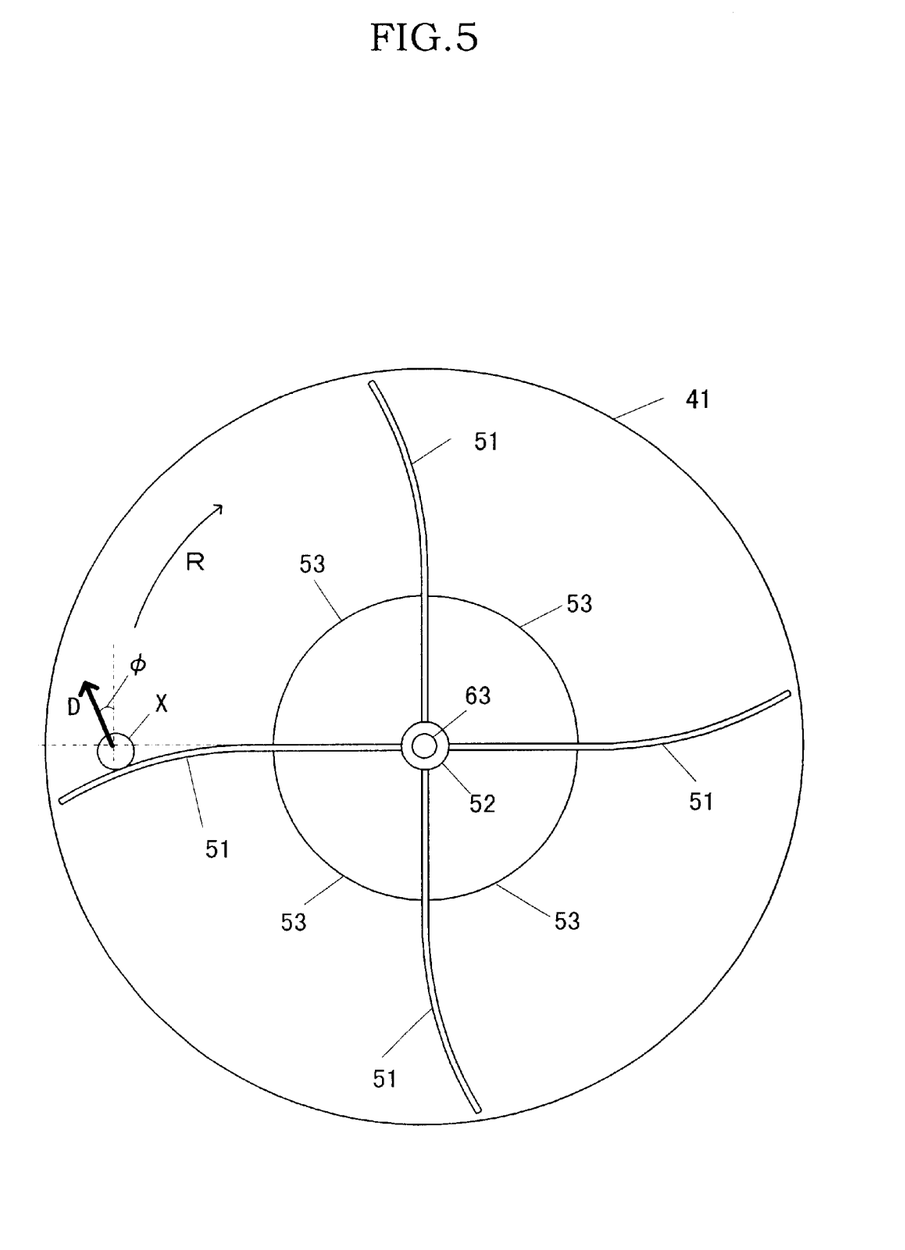
FIG. 5 is an expanded plan view of the distributing apparatus.

In addition, as illustrated in FIG. 5, the stirring blades 51 . . . 51 are designed to have their tip portions curved toward the opposite direction to a rotation direction "R". With this arrangement, when the side surface of the end portion of the stirring blade 51 comes into contact with the article X on the distributing table 41, a force D will work which is directed toward the peripheral edge portion of the distributing table 41, that is, toward the conveyance feeder 22. Also when the article X comes into contact with the side surface of other part than the end portion of the stirring blade 51, because the upper surface 41a of the distributing table 41 provided below slants downwards, the article X similarly moves toward the direction of the conveyance feeder 22. The articles X on the cover members 53 . . . 53 similarly move toward the direction of the conveyance feeder 22 because a centrifugal force of the article X is generated due to the rotation of the cover members 53 . . . 53 and also because the upper surfaces of the cover members 53 . . . 53 slant downwards.

Next, function of the combinational weighing apparatus 1 will de described.

First, when the articles X are fed into the article supply hopper 27, they will fall on the distributing apparatus 21. In this case, when the stirring blade 51 rotates, the articles X will be distributed to the conveyance feeder 22 by the stirring blade 51 while falling down along the slant surface of the distributing table 41. Then, the distributed articles X are supplied to the pool hoppers 23 . . . 23 and the weighing hoppers 24 . . . 24 through the conveyance feeders 22 . . . 22 by the vibration of the excitation units 22a . . . 22a, discharged to the collection chute 30 from the weighing hoppers 24 . . . 24 relevant to the combination and then discharged outside the apparatus.

In this case, there might occur a case where while the articles X are stirred on the distributing table 41 in contact with the stirring blade 51, they might be caught between the stirring blade 51 and the distributing table 41. On this occasion, as described above with reference to FIG. 4, the articles X will be subjected to the force A from the stirring blade 51 and the force B from the distributing table 41. In this case, because the gap 71 between the lower side 51a of the stirring blade 51 and the upper surface 41a of the distributing table 41 is designed to be increased downwards, these forces A and B work on the article X not in parallel to each other but crossing with each other and as a result, the composite force C will be a force directed slantwise downward in the same manner as the upper surface 41a of the distributing table 41 slants downward and the stirring blade 51 slants downward. Accordingly, the composite force C will work as a force pushing the article X slantwise downward, so that the article is pushed out slantwise downward to eliminate a state of being caught.

Moreover, because the composite force C will work on the article X at a time point when the article comes into contact with the stirring blade 51 rotating on the distributing table, a state where the article is caught therebetween is less liable to occur to enable reduction in the occurrence of the state of being caught. As a result, it is possible to minimize the occurrence of a state where the article X is caught between the stirring blade 51 and the distributing table 41 to distribute the articles X to the conveyance feeder 22 as uniformly as possible.

Furthermore, as illustrated in FIG. 5, since the stirring blade 51 is formed to be curved to the direction opposite to the rotation direction R, the force D directed more slantwise downward by an angle φ than that in a case where a stirring blade is not curved will work on the article X in contact with the vicinity of the tip portion of the stirring blade 51. The article X will be accordingly pushed out by the stirring blade 51 toward the direction in which the gap 71 between the stirring blade 51 and the distributing table 41 is increased. This further minimizes the occurrence of the state where the article X is caught to enable the article X to be distributed to the conveyance feeder 22 more reliably and as uniformly as possible.

On the other hand, when the article X continues being in contact with the stirring blade 51, because the stirring blade 51 is curved toward the direction opposite to the rotation direction R as described above, the article X on the distributing table 41 will not be continuously in contact with the same part of the stirring blade 51 but be pushed away slantwise downward while being in contact with the stirring blade 51. This prevents the article X from being dragged to one place to cause a scratch.

Then, in a case where an article is a vegetable, particularly in a case of thin cut foliage vegetables with water thereon, with a conventional distributing apparatus in which a lower side of a stirring member and an upper surface of a distributing table are arranged in parallel to each other, these vegetables are liable to be accumulated on the distributing table due to the above-described catching, whereby removal and cleaning work therefor is necessary to deteriorate weighting work efficiency. With the distributing apparatus 21 of the present invention, articles are less liable to be caught to eliminate the need of the cleaning work, thereby improving distributing work efficiency.

On the other hand, in the weighing apparatus 1, use of the stirring blade 51 as a means for distributing the articles X on the distributing table 41 eliminates the need of such a means for vibrating the distributing table 41 as an excitation unit. As a result, vibration of the weighing hoppers 24 . . . 24 and the load cells 28 . . . 28 is mitigated to enable improvement in weighing precision.

While in the present embodiment, the tip portions of the stirring blades 51 . . . 51 are designed to be curved to the direction opposite to the rotation direction R, they can be replaced by other stirring members after removing the cap 63. In other words, any other shape of the stirring blade is possible that can exert a slantwise downward force directed to the peripheral edge portion of the distributing table 41 onto the article X and it may be appropriately selected according to a kind of article X or a rotation speed of a stirring member.

Figure 6:
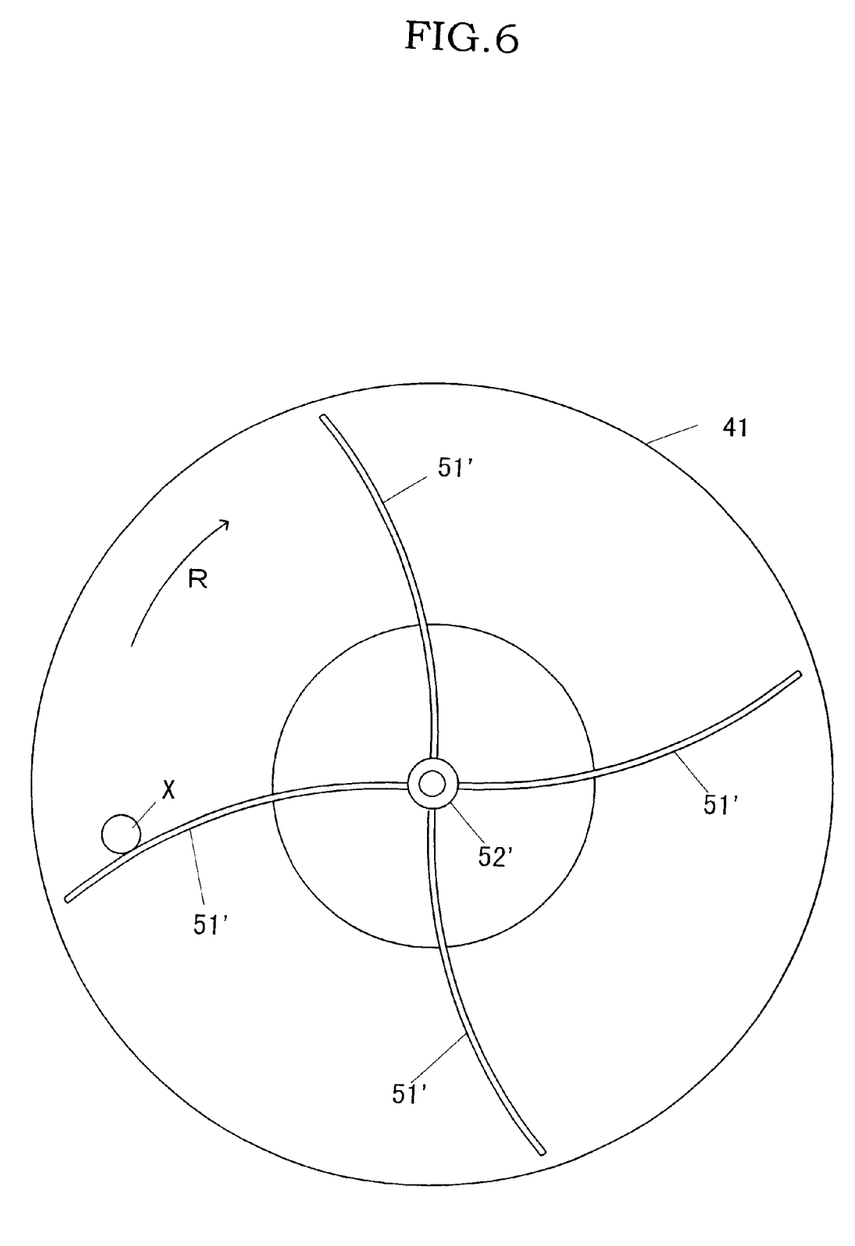
FIG. 6 is a plan view illustrating a second embodiment of the distributing apparatus.

Although in the present embodiment, the stirring blades 51 . . . 51 are designed to curve halfway, for example, they may be such stirring blades 51' . . . 51' as illustrated in FIG. 6 which start curving immediately in the vicinity of a cylindrical member 52'.

Figure 7:
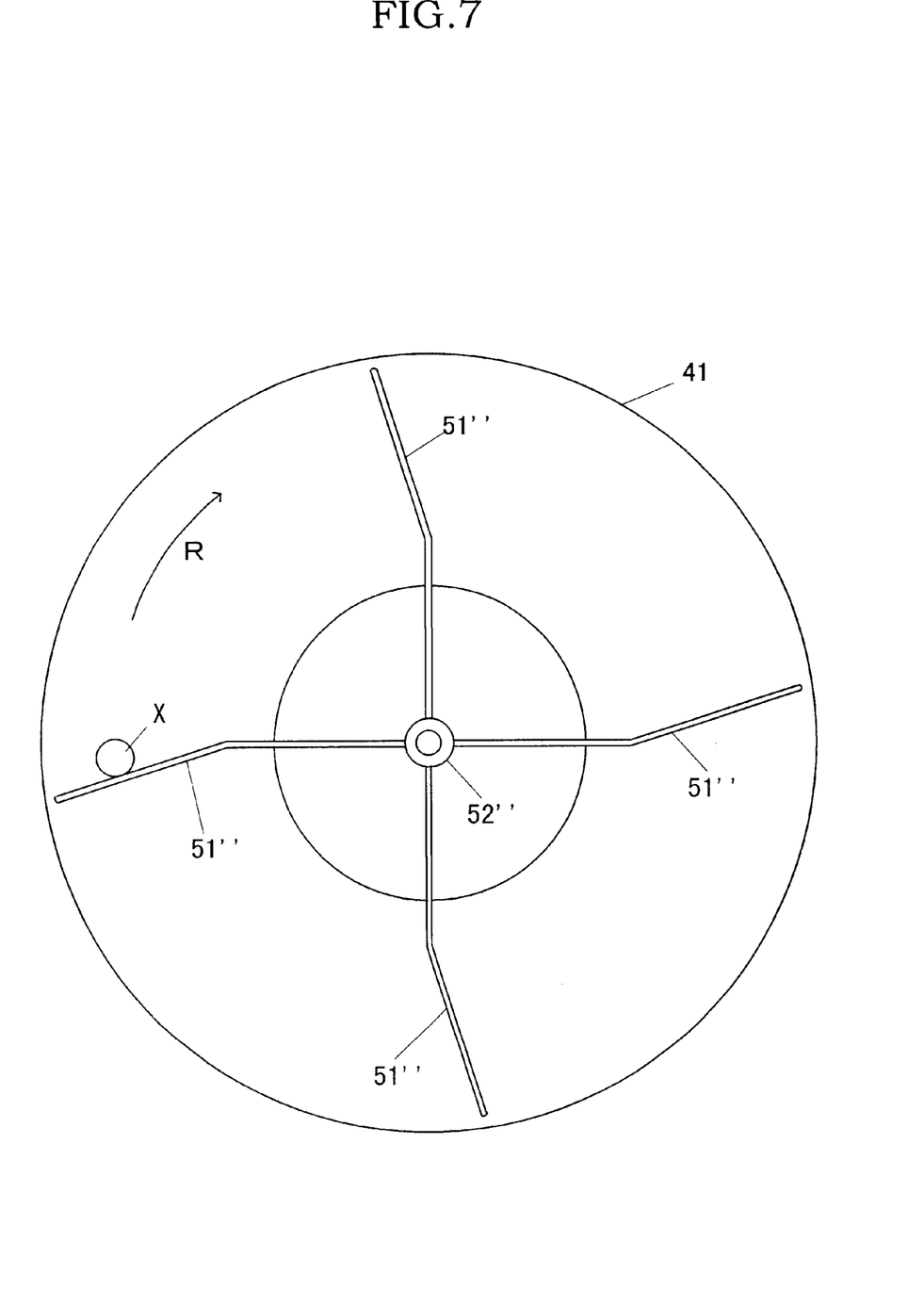
FIG. 7 is a plan view illustrating a third embodiment of the distributing apparatus.

Also as illustrated in FIG. 7, the blades may be straight-shaped stirring blades 51" . . . 51" which extend linearly from a cylindrical member 52" approximately up to the middle and curve halfway to the direction opposite to the rotation direction R.

Figure 8:
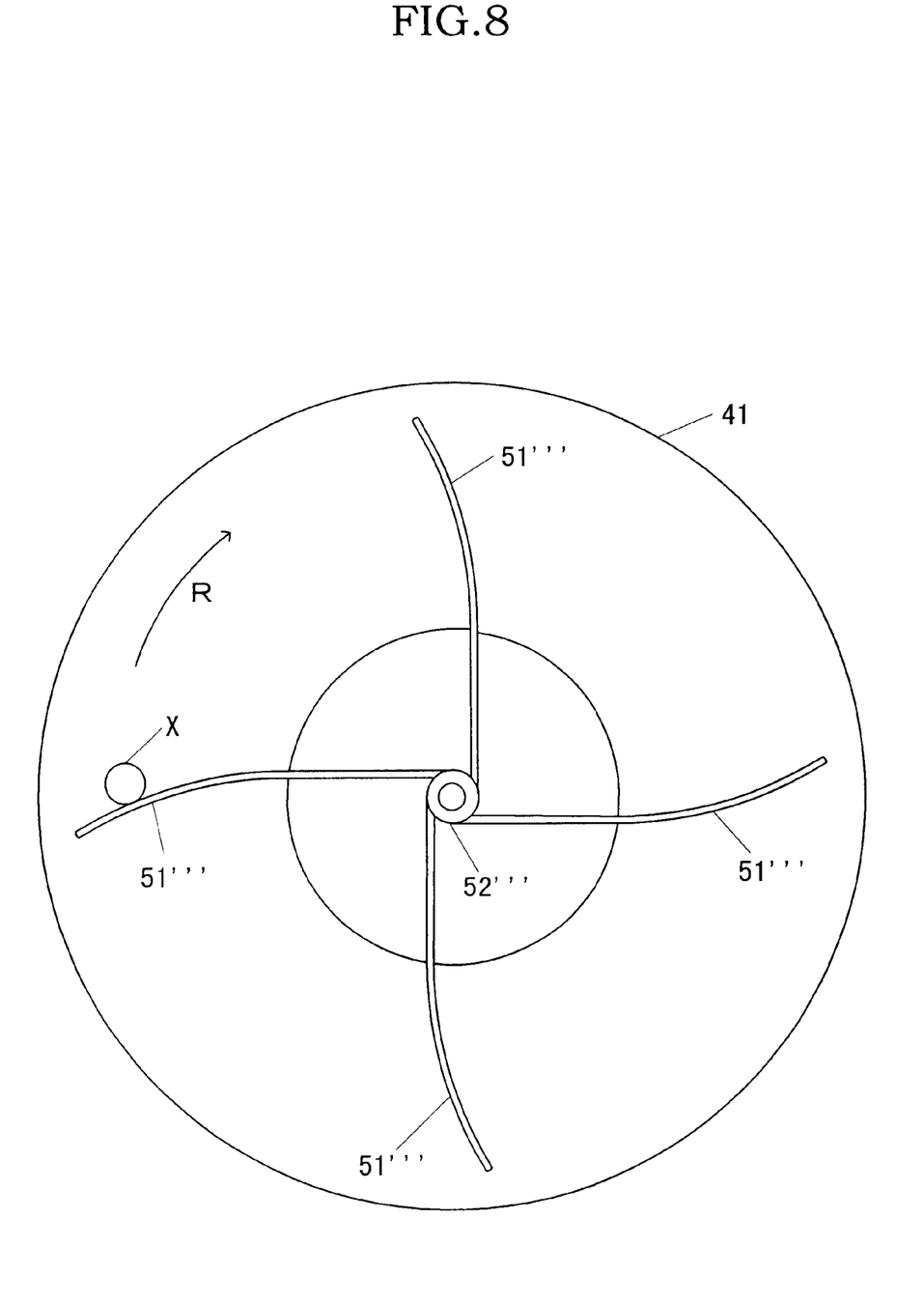
FIG. 8 is a plan view illustrating a fourth embodiment of the distributing apparatus.

Also as illustrated in FIG. 8, stirring blades 51''' . . . 51''' may be attached to a cylindrical member 52''' in the direction of a tangent. In this case, although the tip portion of the blade is designed to be curved in FIG. 8, it may be straight-formed.

Then, although in the above-described example, the plurality of stirring blades are designed to have the same shape, they may have other shapes in combination according to the use of the apparatus.

Moreover, although in the present embodiment, the number of stirring blades is four, it may be appropriately increased or decreased according to, for example, articles to be distributed and a rotation speed of a stirring blade.

The stirring blade may be arranged not to rotate all the time but to rotate when necessary, for example, when an article is fed into the apparatus.

Moreover, an angle of inclination of the lower side of the stirring blade or the upper surface of the distributing table may be changed according to an article. For example, by changing a shape of the upper portion of the rotation shaft and that of the cylindrical member so as to be fit in a spacer or the like to move the stirring blade and the distributing table up and down while keeping the inclinations, the gap may be changed according to an article. In other words, it is possible to further make articles be less liable to be caught.

As described in the foregoing, the present invention provides a combinational weighing apparatus capable of preventing the occurrence of a state where articles are caught in a gap between the distributing table and the stirring member to distribute the articles as uniformly as possible.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A combinational weighing apparatus comprising a distributing apparatus for distributing articles fed from above, a plurality of conveyance apparatuses disposed radially below and around the distributing apparatus and a plurality of weighing apparatuses disposed below the respective plurality of conveyance apparatuses, said distributing apparatus including a conical distributing table, a stirring member having one end attached to a rotation shaft arranged at an apex portion of the distributing table and the other end extending slantwise downward to the vicinity of a peripheral edge of the distributing table, and drive means for rotating said rotation shaft, wherein a gap is provided between a lower side of the stirring member and an upper surface of said distributing table so that said gap between the stirring member and the conical distribution table increases from said apex downward toward said vicinity of said peripheral edge of the conical table.

2. The combinational weighing apparatus according to claim 1, wherein the stirring member is shaped to exert a force on an article on the distributing table to move toward a peripheral edge portion when rotating to come in contact with the article.

3. The combinational weighing apparatus according to claim 1, wherein the distributing table is fixed to the main body of said weighing apparatus.

* * * * *